P. STORME.
DOUGH MOLDING MACHINE.
APPLICATION FILED MAY 26, 1911.
1,018,640.
Patented Feb. 27, 1912.
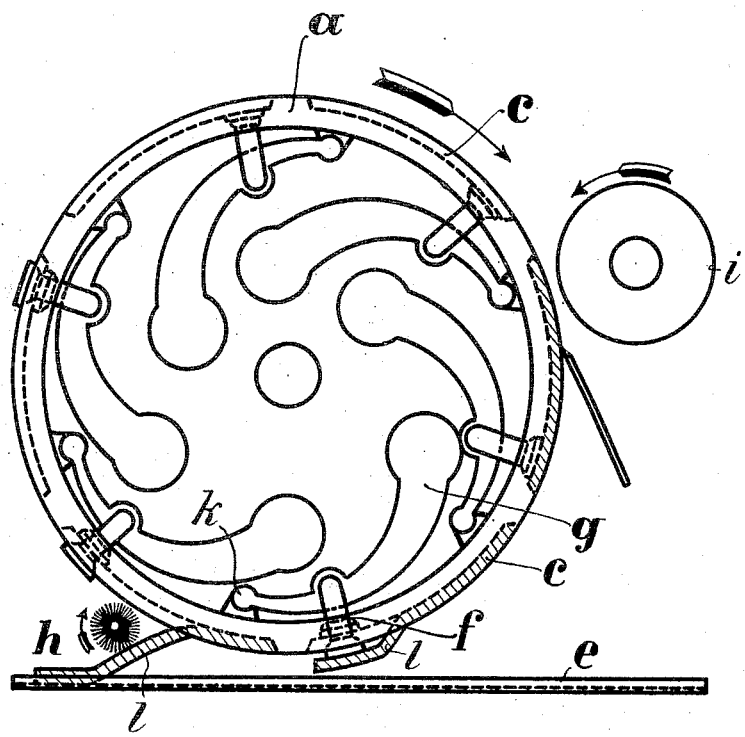
WITNESSES:
INVENTOR:

UNITED STATES PATENT OFFICE.

PETER STORME, OF CREFELD, GERMANY, ASSIGNOR TO THE FIRM OF HENGLER & CRONEMEYER, OF CREFELD, GERMANY.

DOUGH-MOLDING MACHINE.

1,018,640. Specification of Letters Patent. Patented Feb. 27, 1912.

Application filed May 26, 1911. Serial No. 629,659.

*To all whom it may concern:*

Be it known that I, PETER STORME, a subject of the Emperor of Germany, residing at Crefeld, Germany, have invented a certain Improved Dough-Molding Machine, of which the following is a specification.

It is known to divide dough into ornamental forms, for making biscuits and the like by means of a revolving cylinder into molds on the surface of which the dough is pressed. It is also known to expel the dough figures from the molds by means of radially arranged plungers which normally form part of the molds and which are thrust outward as the cylinder revolves.

According to the present invention, which consists in a machine of the kind, the plungers are so constructed and arranged as to act on the forward end of the mold figure only, a soft brush roller, such as used in connection with other kinds of dough molding machines, being employed for engaging the thus projected forward end of the dough figure and strip the same off the cylinder. In this manner the ornamentations of the dough figures are not so liable to be damaged as is ordinarily the case.

The invention is illustrated by way of example in the accompanying drawing by a sectional side view of the arrangement.

A cylinder $a$ is fitted on its outer surface with molds $c$ into which, while the elements are rotated in the direction of the arrows, dough is pressed by a roller $i$. At the forward end of each mold $c$ a radially arranged plunger $f$ is provided which normally forms part of the mold and which can be adjusted in longitudinal direction. The plungers may be made sufficiently heavy for adjusting themselves by their own gravity as their position is altered owing to the rotation of the cylinder, or they may be actuated by weighted levers $g$ pivoted at $k$ in the interior of the cylinder. Dough $l$ is pressed into the molds $c$ as the cylinder rotates, and as the filled molds descend on the cylinder the plungers $f$ are gradually thrust outward by the weight of the levers $g$, the front end of the dough figures being thereby projected as shown in the lower part of the illustration. A brush roller $h$, which rotates in the direction of the arrow, engages the projected part of the figure and strips the whole figure from the cylinder. A traveling apron $e$ receives the figures and transports them away from the machine.

The brush roller is made very soft so as not to damage the ornamentation of the dough figures. Instead of a brush roller, one made of other suitable material, such as soft rubber with or without ribs, felt, or the like, may be employed.

I claim:—

In a dough molding machine of the character described, the combination with a rotating cylinder having on its surface ornamental molds for the reception of the dough, and with a soft brush roller for stripping the dough figures off the cylinder, of a radially disposed plunger arranged at the forward end of each mold, and a pivoted lever connected to said plunger so as to act thereon by its weight as the cylinder revolves and so to press the end of the dough figure into engagement with said brush roller, substantially as set forth.

PETER STORME.

Witnesses:
HENRY QUADFLIEG,
ELISE KALBUSCH.